United States Patent [19]

Watanabe

[11] Patent Number: 4,743,768
[45] Date of Patent: May 10, 1988

[54] METHOD AND APPARATUS FOR MEASURING NON-LINEARITY OF A PATTERN EDGE

[75] Inventor: Tomohide Watanabe, Yokohama, Japan

[73] Assignee: Kabushiki Kaisha Toshiba, Kanagawa, Japan

[21] Appl. No.: 815,927

[22] Filed: Jan. 3, 1986

[30] Foreign Application Priority Data

Jan. 9, 1985 [JP] Japan .................................. 60-1766

[51] Int. Cl.⁴ .............................................. G06K 9/03
[52] U.S. Cl. .................................... 250/556; 250/563; 382/67
[58] Field of Search ........................ 250/556, 560–563, 250/571–572, 559; 356/376–377, 237, 71; 382/30, 33–34, 67

[56] References Cited

U.S. PATENT DOCUMENTS 4,435,834 3/1984 Pauli et al. ............................ 250/556
4,598,419 7/1986 Mignot et al. ......................... 382/67

FOREIGN PATENT DOCUMENTS 2109923 6/1983 United Kingdom.

Primary Examiner—Edward P. Westin
Attorney, Agent, or Firm—Schwartz, Jeffery, Schwaab, Mack, Blumenthal & Evans

[57] ABSTRACT

A method of measuring non-linearity of a pattern edge of a pattern formed on a metal plate such as a glass plate and an apparatus for measuring the same are disclosed. With this novel pattern edge measurement system, first is to dispose a pattern to be measured so that a photosensitive picture element column in a light-receiving unit is substantially in parallel with a pattern edge of an image of the pattern to effect a relative movement of the light-receiving unit or the image of the pattern so that light-receiving unit traverses the pattern edge. Next is to memorize a signal indicative of a light received by the photosensitive picture element column every predetermined moving distances of the light-receiving unit or the pattern to determine a pattern edge position per each photosensitive picture element by making use of the received light signal. Then, a non-linearity of the pattern is computed on the basis of each pattern edge position. Thus, the novel pattern edge measuring system makes it possible to quantitatively measure a non-linearity of a pattern edge with high precision.

13 Claims, 4 Drawing Sheets

METHOD AND APPARATUS FOR MEASURING NON-LINEARITY OF A PATTERN EDGE

BACKGROUND OF THE INVENTION

The present invention relates to a method of measuring a non-linearity of a pattern edge of a pattern formed on a surface of a base plate e.g. a glass plate, a film, or a metal plate etc. and an apparatus for measuring the same.

There have been employed in the art various methods of forming a pattern on a surface of a base plate e.g. a glass plate, a film, or a metal plate etc. For instance, one method is to uniformly coat a photosensitive material on the base plate and to apply a selective exposure to the photosensitive material, thus forming a pattern by photolithographic techniques. Another method is to form a uniform metallic thin film and to irradiate it with a laser beam of a high energy or the like to evaporate the metallic thin film, thus forming a pattern.

However, with these methods, an ideal pattern cannot be formed, giving rise to various undesirable errors. For instance, errors include there are pattern distortion, pattern shift, an error in a line width of the pattern, rounded corner of the pattern, non-linearity in the pattern edge, and lack of clarity in the pattern etc. The non-linearity of the pattern edge among these errors represents the degree of unevenness of edges of a pattern formed. Namely, where a pattern as shown in FIG. 2a is actually formed, pattern edges become uneven as indicated in FIG. 2b. The degree of the non-linearity of the pattern edge is defined by a distance L between the concave and the convex parts of the pattern edge.

Hitherto, a method was employed to magnify the pattern by using an optical microscope or an electron microscope to visually observe the magnified pattern, thus measuring the non-linearity of the pattern edge. However, with this method, it was difficult to quantitatively measure the non-linearity of the pattern edge with high precision. Further, there is a possibility that variations in measured results occur depending upon observers. Another method was to take an enlarged photograph to measure pattern edges by using a scale. However, the drawbacks with the, latter method are that it takes much too time for obtaining the measured result and measurements cannot be made with high precision.

SUMMARY OF THE INVENTION

With the above in view, an object of the present invention is to provide a method of measuring a pattern edge and an apparatus for measuring the same, which makes it possible to quantitatively measure a non-linearity of a pattern edge with high precision.

The above-mentioned object is achieved by the provision of a method of measuring non-linearity of a pattern edge comprising the steps of: disposing a pattern to be measured so that a photosensitive picture element column in a light-receiving unit is substantially in parallel with a pattern edge of an image of a pattern to be measured; moving the light-receiving unit or the image of the pattern to be measured so that the photosensitive picture element column in the light-receiving unit traverses the pattern edge of the image of the pattern to be measured in a manner substantially perpendicular thereto; memorizing a signal indicative of a light received by the photosensitive picture element column every predetermined moving distance of the light-receiving unit or the pattern to be measured; determining a pattern edge position per each photosensitive picture element by making use of the signal indicative of the received light thus memorized; and computing a non-linearity of the pattern edge on the basis of each pattern edge location.

Further, the above-mentioned object is achieved by the provision of an apparatus comprising: a light-receiving unit having at least one photosensitive picture element column; a mount table adapted to mount an object of measurement including a pattern to be measured thereon; an optical system for forming an image of the pattern to be measured on the light-receiving unit; moving means for moving the mount table so that the photosensitive picture element column in the light-receiving unit is substantially in parallel with a pattern edge of the image of the pattern to be measured which has been formed by the optical system; drive means for moving the light-receiving unit or the image of the pattern to be measured so that the light receiving unit traverses the pattern edge of the image of the pattern to be measured in a manner substantially perpendicular thereto, memory means for memorizing a signal indicative of a light received by the photosensitive picture element column every predetermined moving distance of the light-receiving unit or the pattern to be measured moved by the drive means; determining means for determining a pattern edge position per each photosensitive picture element by making use of the signal indicative of received light memorized in the memory means; and computing means for computing a non-linearity of the pattern edge on the basis of each pattern edge position determined by the determining means.

DETAILED DESCRIPTION OF THE INVENTION

Figure 1:
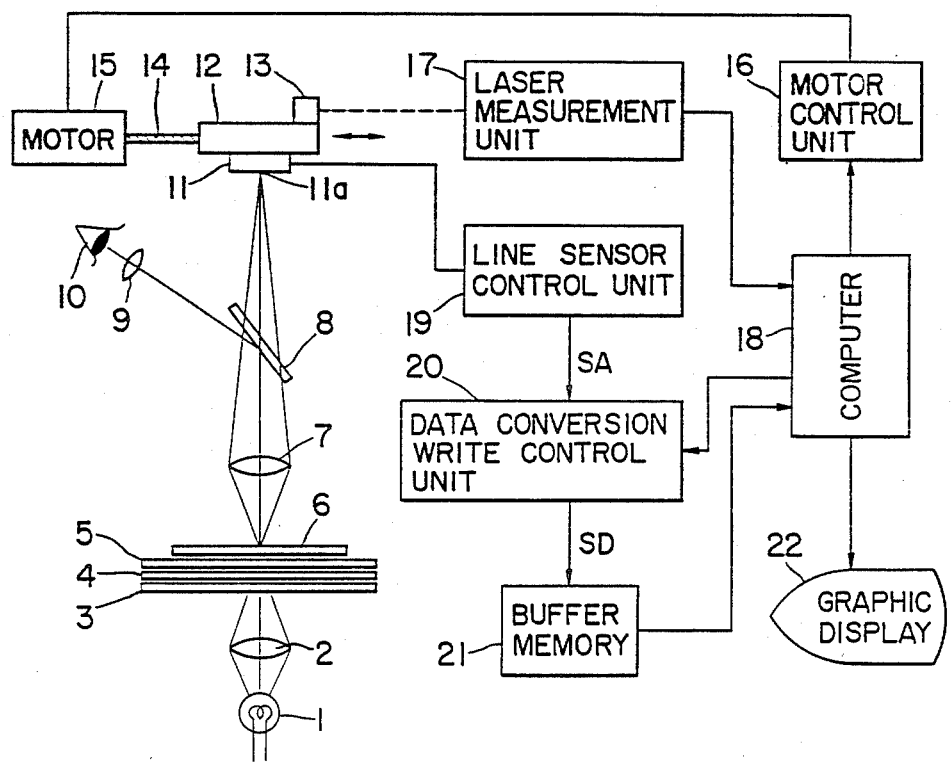
FIG. 1 is a block diagram illustrating an embodiment of a pattern edge measuring apparatus according to the present invention.
Figure 2A:
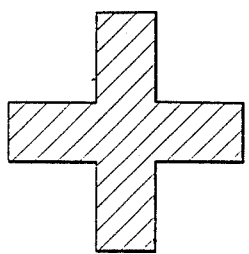
FIGS. 2a and 2b are views schematically illustrating a pattern to be measured, and pattern edges thereof, respectively.
Figure 2B:
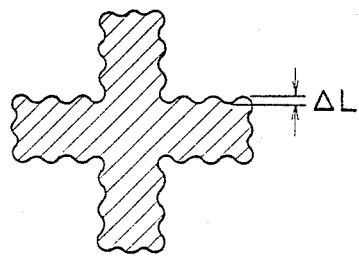

Referring to FIG. 1, there is shown an embodiment of a pattern edge measuring apparatus according to the present invention. This pattern edge measuring apparatus is adapted to measure a non-linearity of a pattern edge of an opaque pattern formed on a transparent base plate e.g. a glass plate etc. By using an illumination system comprising an illuminating lamp 1 and an illuminating condenser 2, a base plate 6 on which a pattern is formed is irradiated from a position underneath the base plate 6. On an X-table 3 moving in the X direction, there is provided a Y-table 4 moving in the Y direction perpendicular to the moving direction of the X-table 3. On the Y-table 4, a rotatable table 5 is provided. The base plate 6 on which the pattern is formed is mounted on the rotatable table 5. The X-table 3, the Y-table 4 and the rotatable table 5 allows a pattern edge of the pattern to be measured to be located at an arbitrary position on the base plate 6 and to be set at a predetermined measuring position.

The pattern to be measured on the base plate 6 is magnified by an objective 7. An image thereof is formed on a light receiving unit 11a of a line or linear sensor 11. By providing a half-mirror 8 between the objective 7 and the line sensor 11, it is possible to visually observe the image of the pattern to be measured through an eyepiece 9.

To a sensor table 12, the line sensor 11 (e.g. linear image sensor TCD 105C fabricated by K.K.TOSHIBA) for optically receiving an image of a pattern to be measured and a mirror 13 for measuring the position of the sensor table 12 are secured. The sensor table 12 is directly coupled to a feed screw 14. By rotating the feed screw 14 by using a motor 15, the sensor table 12 is moved. The motor 15 is controlled by a motor control unit 16.

The position of the sensor table 12 is measured by a laser measurement unit 17. Namely, the laser measurement unit 17 emits a laser beam towards the mirror 13 provided on the sensor table 12 to measure a distance between the sensor table 12 and the laser measurement unit 17 by using a reflected light from the mirror 13. The measured value is input to a computer 18.

The laser measurement unit 17 is capable of measuring a distance with extremely high precision and is effective when a high precision measurement is required as in the case of measurement of mask patterns of semiconductor devices. When there is no need of high precision measurement, the position of the sensor table 12 may be measured by using a rotational angle of the motor 15.

A line sensor control unit 19 is provided for controlling the line sensor 11. Namely, the line sensor control unit 19 is operative to output a drive signal to the line sensor 11 to serially read a signal indicative of the received light (which will be simply referred to as a "received light signal" hereinafter) which has undergone opto-to-electro conversion by the photosensitive picture element column arranged in the light-receiving unit 11a provided on the line sensor 11. The received light signal SA thus serially read is output to a data conversion write control unit 20.

The data conversion write control unit 20 is controlled by the computer 18 to apply an analog-to-digital conversion to the analog received light signal SA from the line sensor control unit 19 to write it into a buffer memory 21 as a digital received light signal SD. In this embodiment, 7 bits are used to express the digital received light signal SD as a multivalue signal variable from 0 to 100. Writing into the buffer memory 21 is carried out every each scanning of the line sensor 11. Where the line sensor 11 comprises N photosensitive picture elements, N digital received light signals SD are written during one scanning.

The digital received light signal SD written into the buffer memory 21 is subject to computational processing by the computer 18. Such a computational processing may be effected during each scanning operation.

To the computer 18, a graphic display 22 is connected. On the graphic display 22, a shape of a pattern edge of a pattern to be measured or a measured result of the non-linearity of a pattern edge is displayed.

A measuring method with the pattern edge measuring apparatus thus configured will now be described.

First the X-table 3, the Y-table 4 and the rotatable table 5 are moved so that a pattern edge of a pattern to be measured is substantially in parallel with the photosensitive picture element column of the line sensor 11. To perform such a movement operation, the operator visually observes the pattern to be measured through the half-mirror 8 and the eyepiece 9.

Figure 3:
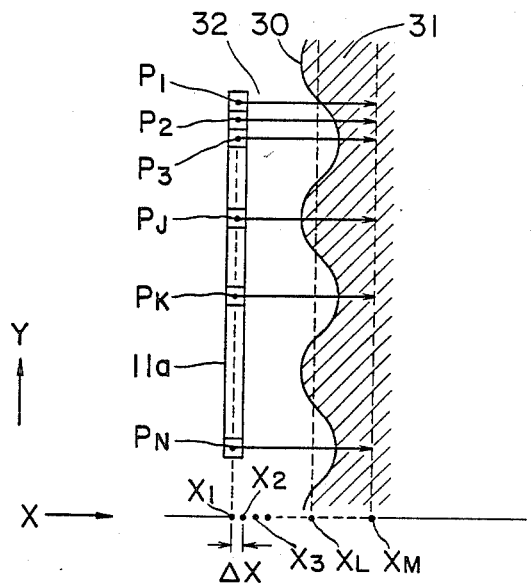
FIGS. 3 to 5 are explanatory views showing a measuring method with the pattern edge measuring apparatus shown in FIG. 1.

FIG. 3 shows the condition where a pattern edge 30 of a pattern 31 to be measured is moved so that it is substantially in parallel to the light-receiving unit 11a of the line sensor 11 wherein a transparent portion is represented by reference numeral 32. The light-receiving unit 11a comprises N photosensitive picture elements $P_1, P_2, \ldots, P_N$ aligned in the Y direction. By moving the light-receiving unit 11a in the X direction, the pattern edge 30 is measured.

In response to a command from the computer 18, the motor control unit 16 is operative to rotate the motor 15 to continuously move the sensor table 12 at a fixed speed through the feed screw 14. As a result, the light-receiving unit 11a of the line sensor 11 is moved in the X direction. Accordingly, respective picture elements $P_1, P_2, \ldots, P_n$ of the light-receiving unit 11a moves so that they traverse the pattern edge 30. Thus, a light signal corresponding to the shape of the pattern edge 30 is incident to the respective picture elements $P_1, P_2, \ldots, P_N$.

To precisely recognize the position of the light-receiving unit 11a, an amount of movement in the X direction of the sensor table 12 is measured by the laser measurement unit 17. Since the line sensor 11 is secured to the sensor table 12, it is possible to recognize the position of the light-receiving unit 11a of the line sensor 11 on the basis of a measured value obtained with the laser measurement unit 17. A signal indicative of the measured value from the laser measurement unit 17 is input to the computer 18.

The computer 18 responds to the measurement signal from the laser measurement unit 17 to deliver a write command to the data conversion write control unit 20 every time the line sensor light-receiving unit 11a is moved by a predetermined distance $\Delta X$. Upon receiving the write command, the data conversion write control unit 20 becomes operative to convert a current received light signal SA into a digital received light signal SD to write it into the buffer memory 21. When N digital received light signals SD of photosensitive picture elements $P_1, P_2, \ldots P_x$ corresponding to one line scanning are written into the buffer memory 21, the computer 18 reads the contents of the buffer memory 21 to memorize the contents thus read.

Figure 4A:
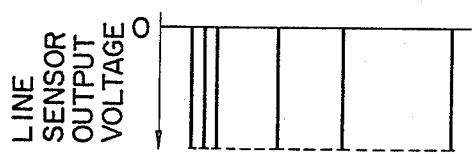
Figure 4B:
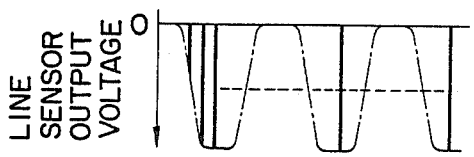
Figure 4C:
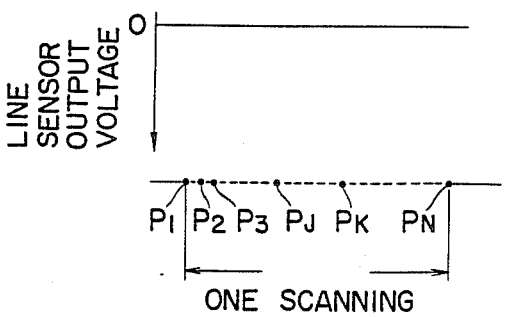

When the line sensor light-receiving unit 11a is shifted from the position $X_1$ to the position $X_m$ in the manner stated above, digital received light signals SD obtained by applying digital conversion to the received light signals SA of the respective photosensitive picture elements $P_1, \ldots, P_N$ at positions $X_1, X_2, \ldots, X_j, \ldots X_M$ are memorized into the computer 18. At the position $X_1$, the light-receiving unit 11a is located on the transparent portion 32 as shown in FIG. 3. Accordingly, as shown in FIG. 4a, received light signals of the respective light-sensitive picture elements $P_1, \ldots, P_N$ all exhibit maximum values. At the position $X_L$, the light-receiving unit 11a is located on the pattern edge 30. Accordingly, as shown in FIG. 4b, the received light signals from the respective photosensitive picture elements $P_1, \ldots, P_N$ become appear as waveforms shaped in correspondence with the shape of the pattern edge 30. At the position $X_M$, as shown in FIG. 4c, all the received light signals of the respective picture elements $P_1, \ldots, P_N$ become zero.

Figure 5A:
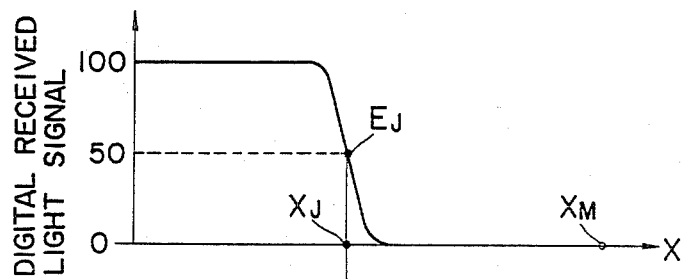
Figure 5B:
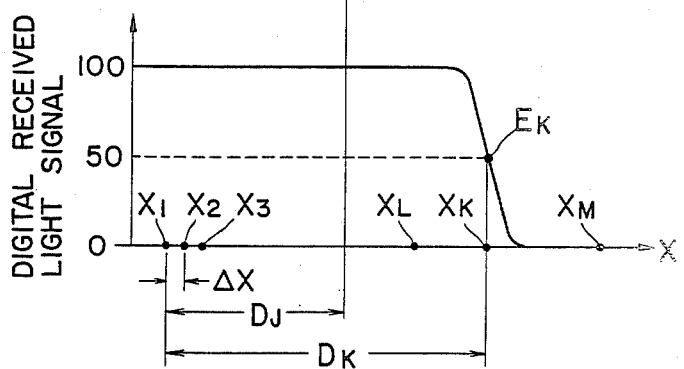

The computer 18 executes a computation of the pattern edge positions at the respective photosensitive picture elements $P_1, \ldots, P_N$ on the basis of received light signals SD of the photosensitive picture elements $P_1, \ldots, P_N$ at the respective coordinate positions $X_1, \ldots, X_M$. The pattern edge location is determined as a coordinate position obtained when a received light signal SD of a certain photosensitive picture element achieves a predetermined threshold level. For instance, received light signals of photosensitive picture elements $P_J$ and $P_K$ vary as shown in FIGS. 5a and 5b. If the threshold level is set at 50, the position when a received light signal is equal to this threshold level corresponds to the pattern edge location. The pattern edge location of the photosensitive picture element $P_j$ is the position $X_j$ spaced from the position $X_1$ by a distance $D_j$. Likewise, the pattern edge location of the photosensitive picture element $P_K$ is the position $X_K$ spaced from the position $X_1$ by a distance $D_K$.

Thus, the computer 18 effects a computation to obtain distances $D_1, \ldots, D_N$ at the respective photosensitive picture elements $P_1, \ldots, P_N$ to compute the non-linearity of the pattern edge 30 on the basis of distances thus obtained. If the maximum value and the minimum value of the distances $D_1, \ldots, D_N$ are represented by symbols $D_{max}$ and $D_{min}$, respectively, a non-linearity error E of the pattern edge 30 is expressed by the following equation:

$$E = D_{max} - D_{min}.$$

Various definitions in connection with the non-linearity error E of the pattern edge 30 are possible. For instance, the non-linearity error may be defined by using the following equations:

$$E = D_{max} - \sum_{j=1}^{N} D_j/N, \text{ or}$$

$$E = \sum_{j=1}^{N} D_j/N - D_{min}.$$

The non-linearity error E of the pattern edge 30 thus obtained is displayed on the graphic display 22.

As stated above, the pattern edge measuring apparatus according to the first-mentioned embodiment can quantitatively measure the non-linearity of a pattern edge of a pattern to be measured. Particularly, the position measurement is carried out by the laser measurement unit, thus making it possible to measure nonlinearity with high precision.

Figure 6:
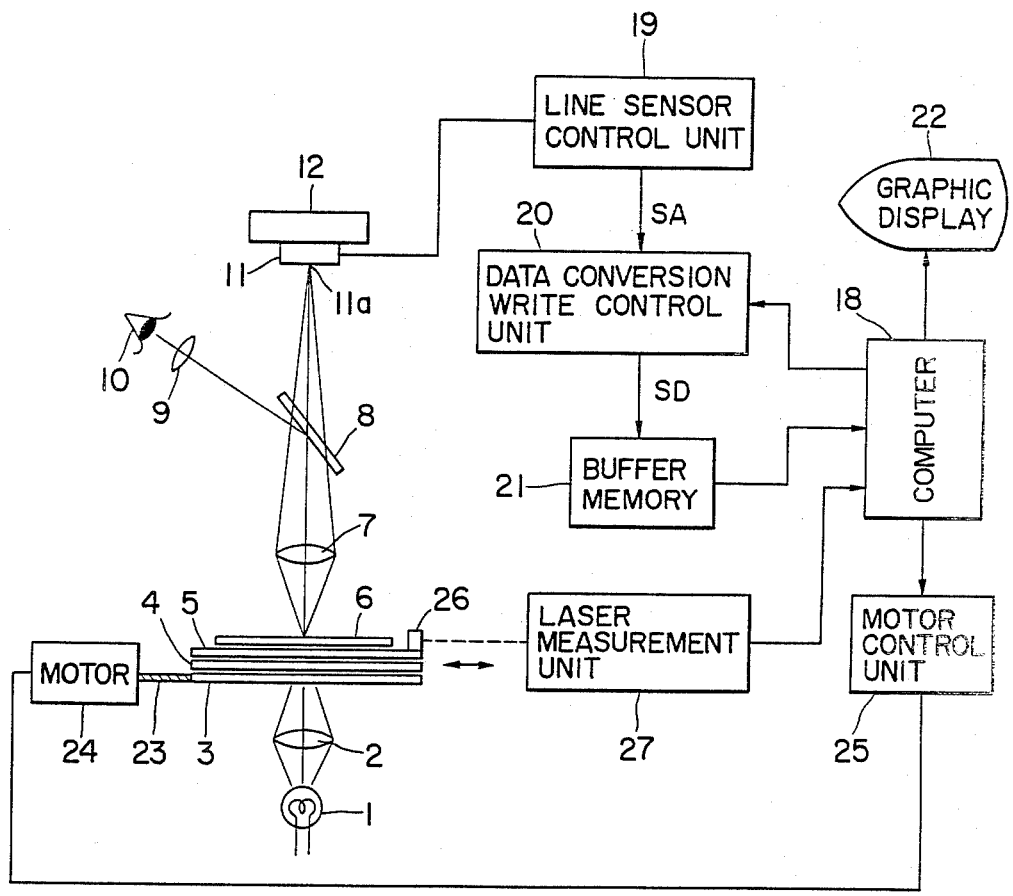
FIG. 6 is a block diagram illustrating another embodiment of a pattern edge measuring apparatus according to the present invention.

Referring to FIG. 6, there is shown another embodiment of a pattern edge measuring apparatus according to the present invention. In the above-mentioned embodiment, the pattern edge measuring apparatus is configured so as to move the sensor table 12 on which the line sensor 11 is mounted in the X direction. In contrast, the pattern edge measuring apparatus in this embodiment is configured so that the sensor table 12 is fixed to move the base plate 6 by the X-table 3. Namely, to move the X-table 3, a motor 24 and a feed screw 23 rotated by the motor 24 are provided wherein the feed screw 23 is directly coupled to the X table 3. Further, the motor 24 is controlled by a motor control unit 25.

The position of the rotatable table 5 on the X-table 3 and the Y-table 4 is measured by a laser measurement unit 27. The laser measurement unit 27 emits a laser beam toward a mirror 26 provided on the rotatable table 5 to measure a distance between the laser measurement unit 27 and the rotatable table 5, i.e., the base plate 6 by using a reflected light from the mirror 26. The measured value is input to the computer 18.

A measuring method with the pattern edge measurement apparatus thus configured will be briefly described.

First the X-table 3, the Y-table 4 and the rotatable table 5 are moved so that a pattern edge of a pattern to be measured is substantially in parallel with a photosensitive picture element column of the line sensor 11.

In response to a command from the computer 18, the motor control unit 25 effects a control to rotate the motor 24 to continuously move the X-table 3 at a fixed speed with the feed screw 23. Thus, the pattern edge 30 is moved in the X direction.

To precisely recognize the position of the base plate 6, an amount of movement in the X direction of the X table 3 is measured by the laser measurement unit 27. A signal indicative of the measured value obtained by the laser measurement unit 27 is input to the computer 18.

The computer 18 responds to the measurement signal from the laser measurement unit 27 to deliver a write command to the data conversion write control unit 20 every time the base plate 6 is shifted by predetermined distance $\Delta X$. Upon receiving this write command, the data conversion write control unit 20 becomes operative to convert a current received light signal SA into a digital received light signal SD to write it into the buffer memory 21. The processing of received light signal is the same as in the above-mentioned embodiment.

The pattern edge measuring apparatus according to this embodiment is configured so that the sensor table is fixed to move the X table. Since the X-table is provided with a drive motor which has been already assembled therein, it is unnecessary to newly add another motor.

In the above-mentioned embodiments, a pattern edge of an opaque pattern formed on a transparent base plate e.g. a photographic manuscript etc. is measured. In addition to such a pattern, the present invention is applicable to a measurement of a pattern edge of a pattern such as a lead frame obtained by machining a metal thin plate in the form of a predetermined pattern. Further, a pattern formed on an opaque base plate can be measured by using a reflected light.

Not only the line sensor employed in the above-mentioned embodiments but also a two dimensional or area sensor can be used. The optical system may be modified so that an image of a pattern to be measured can move on the light-receiving unit. From the view point of implementation of the present invention, it sufficient that a pattern to be measured can be moved relative to the light receiving unit.

From the foregoing description, the present invention can automatically and qualitatively measure non-linearity of a pattern edge with high precision. Further, the present invention can eliminate variations in measured value by an operator, resulting in improved measurement reproducibility. In addition, since the pattern edge can be automatically measured, it is possible to momentarily obtain a measured result, resulting in improved measurement speed.

What is claimed is:

1. A method of measuring non-linearity of a pattern edge comprising the steps of:
   disposing a pattern to be measured so that a photosensitive picture element column in a light-receiving unit is substantially parallel with a pattern edge of an image of said pattern to be measured;
   moving said light-receiving unit or said image of the pattern to be measured so that said photosensitive picture element column in said light-receiving unit traverses said pattern edge of the image of the pattern to be measured in a manner substantially perpendicular thereto;
   memorizing a signal indicative of light received by said photosensitive picture element column at each of a plurality of predetermined moving distances of said light-receiving unit or said pattern to be measured;
   determining a pattern edge postion per each photosensitive picture element by making use of said signal indicative of the received light thus memorized; and
   computing a non-linearity of the pattern edge on the basis of the determined pattern edge positions.

2. A method as set forth in claim 1, wherein the non-linearity of said pattern edge is determined by subtracting the minimum value of said pattern edge positions from the maximum value thereof.

3. A method as set forth in claim 1, wherein the non-linearity of said pattern edge is determined by subtracting an average value of said determined pattern edge positions from the maximum value thereof.

4. A method as set forth in claim 1, wherein the non-linearity of said pattern edge is determined by subtracting the minimum value of said determined pattern edge positions from an average value thereof.

5. An apparatus for measuring non-linearity of a pattern edge comprising:
   a light-receiving unit having at least one photosensitive picture element column;
   a mount table adapted to mount an object of measurement including a pattern to be measured thereon;
   an optical system for forming an image of the pattern to be measured on said light-receiving unit;
   moving means for moving said mount table so that said photosensitive picture element column provided in said light-receiving unit is substantially parallel with a pattern edge of said image of the pattern to be measured which has been formed by said optical system;
   driving means for moving said light-receiving unit or said image of the pattern to be measured so that said light-receiving unit traverses the pattern edge of said image of the pattern to be measured in a manner substantially perpendicular thereto;
   memory means for memorizing a signal indicative of light received by said photosensitive picture element column at each of a plurality of predetermined moving distances of said light-receiving unit or the pattern to be measured moved by said driving means;
   determining means for determining a pattern edge position per each photosensitive picture element by making use of the signal indicative of received light memorized in said memory means; and
   computing means for computing non-linearity of the pattern edge of the basis of said pattern edge positions determined by the determining means.

6. An apparatus as set forth in claim 5, which further comprises measuring means for measuring a position of said light receiving unit, said driving means being operative to drive said light receiving unit on the basis of said position measured by said measuring means.

7. An apparatus as set forth in claim 5, which further comprises measuring means for measuring a position of said light receiving unit, said driving means being operative to drive said mount table on the basis of said position measured by said measuring means.

8. An apparatus as set forth in claim 6, wherein said computing means computes the non-linearity of said patt.ern edge by subtracting the minimum value of said pattern edge positions from the maximum value thereof.

9. An apparatus as set forth in claim 6, wherein said computing means computes the non-linearity of said pattern edge by subtracting the minimum value of said pattern edge positions from an average value thereof.

10. An apparatus as set forth in claim 6, wherein said computing means computes the non-linearity of said pattern edge by subtracting an average value of said pattern edge positions from the maximum value thereof.

11. An apparatus as set forth in claim 7, wherein said computing means computes the non-linearity of said pattern edge by subtracting the minimum value of said pattern edge positions from the maximum value thereof.

12. An apparatus as set forth in claim 7, wherein said computing means computes the non-linearity of said pattern edge by subtracting the minimum value of said pattern edge positions from an average value thereof.

13. An apparatus as set forth in claim 7, wherein said computing means computes the non-linearity of said pattern edge by subtracting an average value of said pattern edge positions from the maximum value thereof.

* * * * *